Feb. 22, 1955
J. FAVRE
2,702,491
INTERMITTENT DRIVING MECHANISM FOR
THE FILM OF MOTION-PICTURE CAMERAS
Filed Oct. 19, 1953
3 Sheets-Sheet 1
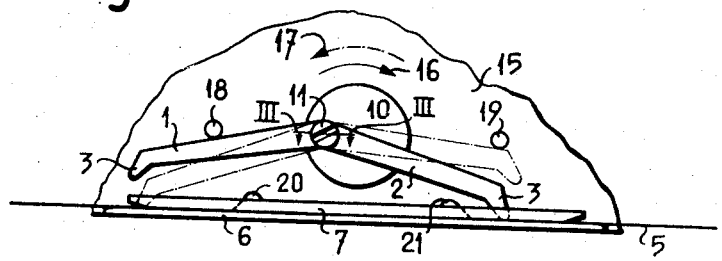
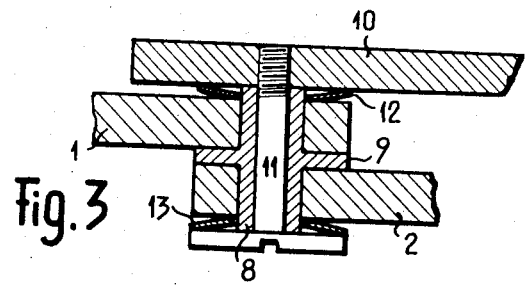
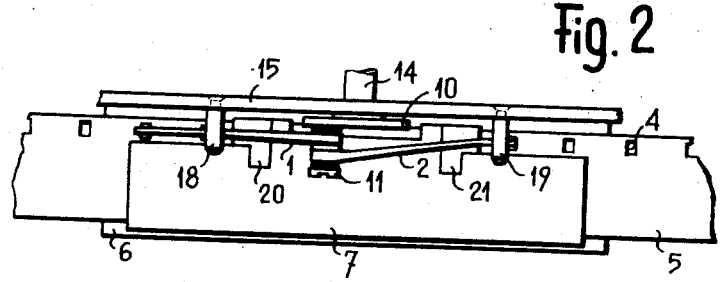
INVENTOR
Jules Favre.
BY
ATTORNEY Feb. 22, 1955 J. FAVRE 2,702,491
INTERMITTENT DRIVING MECHANISM FOR
THE FILM OF MOTION-PICTURE CAMERAS
Filed Oct. 19, 1953 3 Sheets-Sheet 2
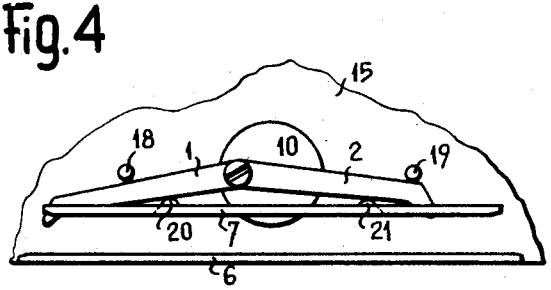
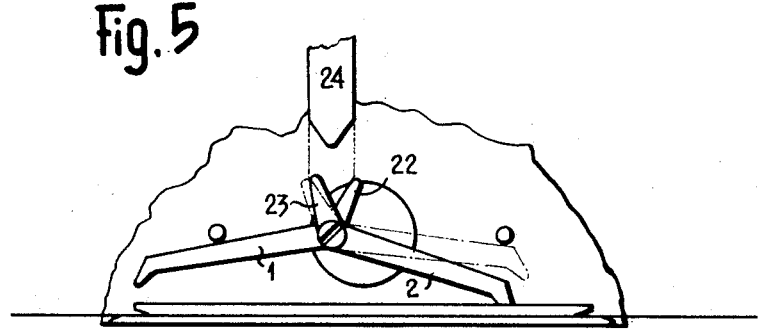
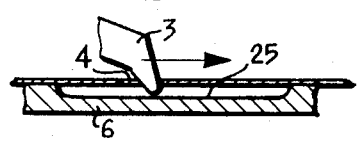 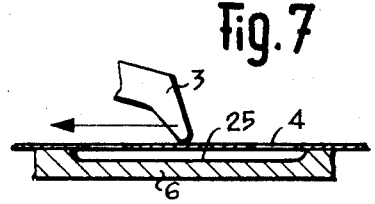
INVENTOR
Jules Favre
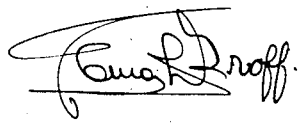
ATTORNEY Feb. 22, 1955

J. FAVRE 2,702,491

INTERMITTENT DRIVING MECHANISM FOR
THE FILM OF MOTION-PICTURE CAMERAS

Filed Oct. 19, 1953

INVENTOR
Jules Favre.

BY

ATTORNEY

United States Patent Office 2,702,491
Patented Feb. 22, 1955

2,702,491

INTERMITTENT DRIVING MECHANISM FOR THE FILM OF MOTION-PICTURE CAMERAS

Jules Favre, Grandson, Switzerland, assignor to Paillard S. A., Sainte-Croix, Switzerland, a corporation of Switzerland Application October 19, 1953, Serial No. 386,889

Claims priority, application Switzerland May 1, 1953

3 Claims. (Cl. 88—18.4)

This invention relates to an improvement in film driving mechanism for motion picture cameras.

In cameras of the type set forth it is general practice to use two types of mechanism for driving the film intermittently in front of the exposure aperture. One of these mechanisms comprises a claw which follows a path controlled by cams. This path enables the claw sequentially to enter the perforations of the film, drive the film, retract the perforations, and to effect a return movement of the claw outside the plane of the film. It should be noted that the part of the path followed by the claw while the film is being driven is not always rectilinear. This type of mechanism has the disadvantage of being very costly, because it necessitates the use of precision-machined cams. Moreover, its adjustment is often very delicate. Furthermore, in cases where the mechanism has to drive the film in both directions, the film actually is driven by traction only in one of the two directions with respect to the point where the resultant of the forces exerted by the pressure plate is applied to the film, whereas in the other direction the film is pushed. This may result in the film becoming twisted and may detrimentally affect the steadiness and sharpness of the image.

The other known mechanism employs the pawl principle. The claw forming the pawl is compelled, by known means, to remain in permanent contact with the film. The claw thus drives the film in one direction, whereas in the other direction it merely slides on it. This type of mechanism is of simpler construction than the first, and its inertia is weaker. The path of the claw, when the film is being driven, is rectilinear; hence the image is steady and sharp. Still, the known mechanisms of this type have the disadvantage that the film can be driven in both directions only by resorting to very complicated structural means.

The present invention, intended to overcome the aforesaid disadvantages, relates to an intermittent driving mechanism for the film of a motion-picture camera comprising two claws, one each of which cooperates with a related end of the film gate, the said claws being connected to an actuating eccentric means or crank. This mechanism is characterized by the fact that in one embodiment, a friction element is provided between the said claws and actuating eccentric means or crank so that the latter will impart a torque to the claws with the result that a rotary motion of the crank in one direction will automatically cause the engagement of one of the claws in the perforations of the film and drive it in a given direction, whereas a rotary motion of the crank in the opposite direction will cause the first claw to retract from the perforations of the film, and the latter's engagement by the second claw which will then drive the film in the opposite direction.

The accompanying drawing shows, diagrammatically and by way of example, two embodiments of the invention.

Figure 1 is an enlarged detail of that part of the camera which comprises the intermittent driving mechanism and the film gate.

Figure 2 is a side view of the claws perpendicular to the film.

Figure 3 is a section on a larger scale along III—III of Figure 1.

Figure 4 is a view similar to that of Figure 1 showing the pressure plate open and the claws retracted.

Figure 5 illustrates a modification of the claw retracting arrangement.

Figures 6 and 7 show the claw engaged in the film perforation, while the film is being driven, and sliding on the film during the claw's return movement, respectively.

Similar references designate like parts in the several figures of the drawing.

Figure 8 shows a delivery reel A from which the film is advanced by wheel A' in the direction of the arrow toward the film gate while wheel B' controls the movement of the film to the receiving reel B.

Figure 8:
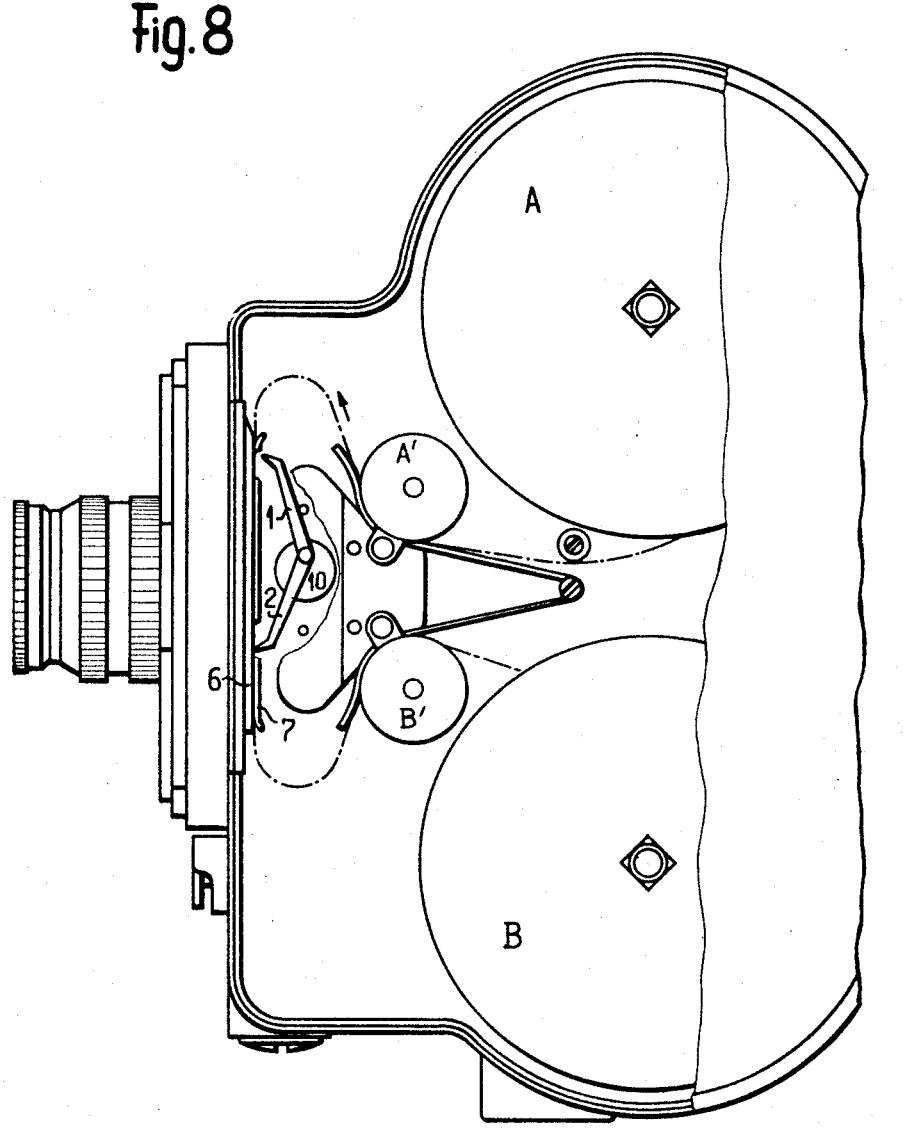
Figure 8 is a diagrammatic elevation partly in section illustrating the application of the invention.

The mechanism according to the invention comprises two claws 1 and 2, each of them provided at one of its ends, for example, the outer or free ends, with a nose 3 adapted to cooperate with the perforations 4 of a film 5 to be driven between a gate 6 and a pressure plate 7. The said nose 3 is designed in such a way that it drives the film when the claw moves toward the end of the film gate, whereas on its return movement it leaves the film perforations and slides on the film as shown in Figures 6 and 7. As also shown in these figures a recess 25 is provided in the film gate 6 to enable nose 3 to engage perforation 4 of the film and to slide on the bottom of said recess when the film is being driven. At their other or inner ends, the claws are carried by a sleeve 8 (Figure 3) and separated by an annular boss 9 provided medially on said sleeve.

Sleeve 8 is mounted on a rotatable disk 10 by an eccentrically positioned pin in the form of a screw 11. Two spring washers are provided to create friction between the claws and one of said washers 12, bears against crank 10 on one side and claw 1 on the other, while the other washer 13, bears against claw 2 on one side and screw head 11 on the other. These washers create friction between the claws and the crank to hold one claw in operative position while the other is inoperative when the disk is rotating in a given direction. Crank disk 10 is rigidly secured to a spindle 14 extending through wall 15 and driven by conventional means not shown. This spindle 14 causes crank 10 to rotate in one or the other of the two directions indicated by arrows 16 and 17. Two stop abutments 18 and 19 are provided to limit the movement of the claws 1 and 2, respectively, in their tendency to follow the rotary movement of crank 10.

The mechanism hereinabove described functions as follows:

When crank 10 is rotated in the direction of arrow 16, it drives the two claws 1 and 2 through the intermediary of sleeve 8. The torque resulting from friction between the crank and the claw compels nose 3 of claw 2 to remain pressed against the film while claw 1 remains inoperative, and thus claw 2, by cooperating with perforations 4, displaces the film from left to right in Figure 1. Under the effect of friction torque, claw 1 will tend to move away from the film, and come to bear against stop 18, to thus remain in continuous contact with said stop until the rotary motion of disk 10 is reversed.

For example, when crank 10 is rotated in the direction of arrow 17, the claws change position under the effect of friction torque so that claw 1 will move the film from right to left in Figure 1, while claw 2 remains in contact with stop 19, as shown in dot-dash lines in Figure 1.

Pressure plate 7 includes two projections 20 and 21 for the purpose of aiding in retracting claws 1 and 2, respectively, when the pressure plate is opened as shown in Figure 4 to permit the film to be changed. The figure shows clearly the functions of projections 20 and 21 with respect to claws 1 and 2. It is obvious that any other equivalent arrangement could be used for the retraction of the claws from film gate.

In the modification shown in Figure 5, claws 1 and 2 are formed by two-arm levers. A control element 24 with a wedge or cone-shaped end portion is intended to cooperate with the angularly disposed arms 22 and 23 of claws 1 and 2 when the pressure plate is opened so as to separate the said arms and bring about the retraction of claws 1 and 2 according to the scissors principle.

It should be pointed out that in certain cases, when the inertia of the claws is weak, the two claws could be designed in a single piece with their integral ends freely and eccentrically mounted on disk 10. Obviously, in that event, stops 18 and 19 would be eliminated because the claw not in use would tend to follow the direction of movement of crank disk 10.

As is evident from the preceding description, the intermittent film driving mechanism herein described presents several advantages over known mechanisms, namely: simplicity of construction owing to the absence of high-cost machined cams; change of direction of the film drive obtained automatically by changing the direction of rotation of the driveshaft; noiseless operation in both directions; simplicity of the retraction of the claws for changing the film.

I claim:

1. Means for moving a marginally perforated motion picture film in either direction, comprising, in combination, a film gate, a pressure plate having openings adjacent each end, a camera frame part disposed in right angular relation to the film gate and pressure plate, a rotatable driven disk mounted in said part, stop abutments on said frame part at either side of the rotary member, a pair of claws having their outer ends provided with nose portions for engaging the marginally perforated film and having their inner ends in axial registry, a sleeve for supporting the inner registering ends of the claws, and having a medial annular flange, a headed pin passing through the sleeve and having an end opposite its head secured eccentrically to the disk, a spring washer between the inner end of one claw and the disk, and a second spring washer between the head of the pin and the inner end of the other claw, and the juxtaposed faces of the inner ends of the claws engaging related faces of said flange, whereby, the head of the pin, when the latter is secured to the disk, places the inner end of each claw under frictional tension so that when the disk is rotated in one direction, the nose of one claw will enter the openings in the pressure plate to engage the marginal perforations of the film and simultaneously the other claw will be moved into engagement with a related abutment on said frame part.

2. Means for moving a marginally perforated motion picture film in either direction according to claim 1, wherein the pressure plate is provided at the inner ends of the openings thereof with raised portions adapted to be engaged by the outer ends of the claws to assist their movement to inoperative position when the pressure plate is moved away from the film gate.

3. Means for moving a marginally perforated motion picture film in either direction, comprising, in combination, a film gate, a pressure plate having openings adjacent each end, a camera frame part at right angles to the film gate and pressure plate, a rotatable disk mounted in said frame part, claw abutments on said frame part on either side of said disk, a pair of claws having their outer ends shaped for entering the marginally perforated film and having their inner ends in registry, said claws outwardly of their point of registration formed with angularly disposed arms, a pin passing through the registering portions of said claws and connecting the latter eccentrically to said disk, and a slidably mounted control element having a substantially conical end portion for entry between said arms of the claws to hold said claws against said abutments when the film gate is open to bring about the retraction of both claws from film engaging position.

References Cited in the file of this patent

UNITED STATES PATENTS

| 1,878,215 | Wellman | Sept. 20, 1932 |

FOREIGN PATENTS

| 685,066 | Germany | Dec. 11, 1939 |